United States Patent
Strutt et al.

(10) Patent No.: US 7,787,382 B2
(45) Date of Patent: Aug. 31, 2010

(54) METHOD FOR CALCULATING SERVICE REDUNDANCY OF A WIRELESS NETWORK

(75) Inventors: Guenael T. Strutt, Sanford, FL (US); Shyamal Ramachandran, Lake Mary, FL (US); Peter J. Stanforth, Winter Springs, FL (US)

(73) Assignee: Motorola, Inc., Schaumburg, IL (US)

( * ) Notice: Subject to any disclaimer, the term of this patent is extended or adjusted under 35 U.S.C. 154(b) by 225 days.

(21) Appl. No.: 11/954,681

(22) Filed: Dec. 12, 2007

(65) Prior Publication Data

US 2009/0154359 A1    Jun. 18, 2009

(51) Int. Cl.
*H04L 12/26* (2006.01)

(52) U.S. Cl. .................................... 370/238; 370/252
(58) Field of Classification Search ............... None
See application file for complete search history.

(56) References Cited

U.S. PATENT DOCUMENTS

| | | | |
|---|---|---|---|
| 2003/0016624 A1* | 1/2003 | Bare | 370/217 |
| 2005/0036487 A1* | 2/2005 | Srikrishna | 370/389 |
| 2005/0108576 A1* | 5/2005 | Munshi | 713/201 |
| 2005/0157697 A1* | 7/2005 | Lee et al. | 370/349 |
| 2005/0286414 A1* | 12/2005 | Young et al. | 370/216 |

FOREIGN PATENT DOCUMENTS

| | | |
|---|---|---|
| EP | 1376939 A2 | 6/2003 |
| WO | 2005029775 A2 | 3/2005 |

OTHER PUBLICATIONS

PCT International Search Report Application No. PCT/US2008/084202—Dated Mar. 13, 2009—18 Pages.
Shah-Heydari et al.: Multiple Failure Analysis with Restoration Paths Matrix—Dated Nov. 29, 2004—6 Pages.
Zhou et al.: Spare Capacity Planning Using Survivable Alternate Routing for Long-Haul WDM Networks—Dated Jul. 1, 2002—8 Pages.
Frank H.P. Fitzek et al; "A Visualisation Tool for AD HOC Networks ViTAN"; Feb. 2003; 4pp.
Yong Gao et al; "Analysis on the Redundancy of Wireless Sensor Networks"; WSNA Sep. 2003; pp. 108-114.
Proxim Wireless Networks; "The Smart, Affordable Way to Build Network Redundancy"; Broadband Wireless; 2004; 12pp.

* cited by examiner

*Primary Examiner*—Seema S Rao
*Assistant Examiner*—Steven Wood
(74) *Attorney, Agent, or Firm*—Randi L. Karpinia

(57) ABSTRACT

A method for calculating service redundancy of a wireless network is provided. The method comprises determining one or more of a plurality of routes through which a node can communicate to reach a destination. A routing metric is calculated for each of the plurality of routes. Using the calculated routing metrics a route having a best routing metric is identified as a best route to the destination. Service redundancy for each node within the wireless network is calculated using a sum of weighted ratios of the best routing metric to at least one alternate routing metric.

13 Claims, 8 Drawing Sheets

METHOD FOR CALCULATING SERVICE REDUNDANCY OF A WIRELESS NETWORK

FIELD OF THE DISCLOSURE

The present disclosure relates generally to wireless networks and more particularly to calculating service redundancy of a wireless network.

BACKGROUND

Wireless communication networks such as mobile wireless telephone networks, have become increasingly prevalent over the past decade. These wireless communications networks include, for example, cellular telephone networks. A terrestrial wireless network includes a plurality of interconnected base stations, or base nodes, that are distributed geographically at designated locations throughout the service area. Wireless communication networks such as wireless mesh networks typically comprise a plurality of nodes that collectively define a path from a mobile client to a destination node, or another network node by way of one or more wireless network nodes. In an Ad-hoc wireless network each mobile node is capable of operating as a base station or router for the other mobile nodes, thus eliminating the need for a fixed infrastructure of base stations.

Some types of wireless networks require a greater level of coverage redundancy. For example, public safety networks need to remain functional even when a certain percentage of the infrastructure is disabled. Some other types of wireless networks, for example, commercial networks may desire to minimize redundancy in order to limit capital and operating expenditures. As can be appreciated from the nature of wireless networks such as those discussed above, it is important to measure a level of redundancy in order to accommodate network needs for greater or lower coverage.

Several techniques exist to measure redundancy. One such technique is to measure redundancy in terms of additional devices or radio links, but it does not take into account the varying capacity associated with each node within the wireless network.

Accordingly, there is a need for a method for calculating service redundancy of a wireless network.

BRIEF DESCRIPTION OF THE FIGURES

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
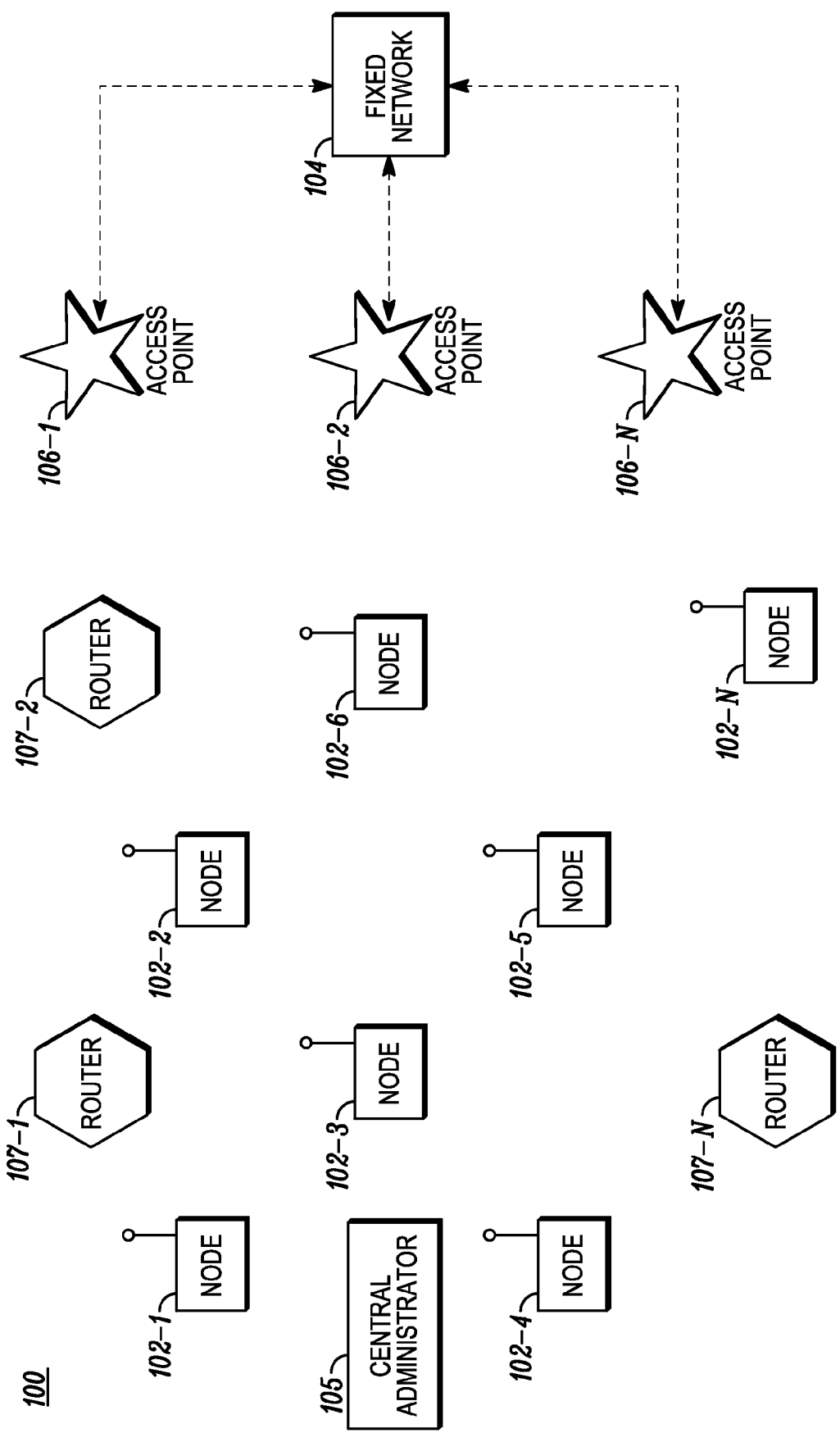
FIG. 1 is a block diagram of an example wireless network including a plurality of nodes employing a system and method in accordance with an embodiment of the present invention.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

Various embodiments of the invention provide a method for calculating service redundancy of a wireless network. One or more of a plurality of routes through which a node can communicate to reach a destination is determined. A routing metric is calculated for each of the plurality of routes. A route having a best routing metric is identified as a best route to the destination. A service redundancy is calculated using a sum of the weighted ratios of the best routing metric to at least one alternate routing metric. Alternate routing metrics are the routing metrics of each of the plurality of routes that are not identified as the best route.

Before describing in detail the method for calculating service redundancy for a wireless network, it should be observed that the present invention resides primarily in combinations of method steps related to a method for calculating service redundancy. Accordingly, the method steps have been represented where appropriate by conventional symbols in the drawings, showing only those specific details that are pertinent to understanding the present invention so as not to obscure the disclosure with details that will be readily apparent to those of ordinary skill in the art having the benefit of the description herein.

FIG. 1 is a block diagram illustrating an example wireless network 100 employing an embodiment of the present invention. The wireless network 100 can be any ad hoc network including a mesh enabled architecture (MEA) network, an Institute of Electrical and Electronics Engineers (IEEE) 802.11 network (i.e. 802.11a, 802.11b, 802.11g, 802.11e or 802.11s) (for reference, see: http://standards.ieee.org/getieee802/index.html or contact the IEEE at IEEE, 445 Hoes Lane, PO Box 1331, Piscataway, N.J. 08855-1331, USA), or any other packetized mesh communication network. As used herein, the term "wireless mesh network" refers to a self-configuring network of nodes connected by wireless links, the union of which forms an arbitrary topology. Specifically, the network 100 includes a plurality of mobile wireless user terminals 102-1 through 102-n (referred to generally as nodes 102 or mobile nodes 102), and can, but is not required to, include a fixed network 104 having a plurality of access points 106-1, 106-2, ... 106-n (referred to generally as nodes 106 or access points 106), for providing nodes 102 with access to the fixed network 104. The fixed network 104 can include, for example, a core local access network (LAN), and a plurality of servers and gateway routers to provide network nodes with access to other networks, such as ad-hoc networks, the public switched telephone network (PSTN) and the Internet. The network 100 further can include a plurality of fixed routers 107-1 through 107-$n$ (referred to generally as nodes 107 or fixed routers 107) for routing data packets between other nodes 102, 106 or 107. It is noted that for purposes of this discussion, the nodes discussed above can be collectively referred to as "nodes 102, 106 and 107", or simply "nodes". Nodes 102, 106, and 107 collectively define a path hereinafter referred to as a route from a client node to a destination node. The network further includes a central administrator 105 to which the nodes can communicate. As used herein, the term "central administrator" refers to one of the nodes 102, 106, or 107 within the network 100 that has been selected to calculate and/or monitor service redundancy of the network 100. Monitoring service redundancy includes, but is not limited to, monitoring service redundancy at each node 102, 106, and 107 within the network 100, and generating a visual display of the service redundancy of the network 100.

As can be appreciated by one skilled in the art, the nodes 102, 106 and 107 are capable of communicating with each other directly, or via one or more other nodes 102, 106 or 107 operating as a router or routers for packets being sent between nodes.

Figure 2:
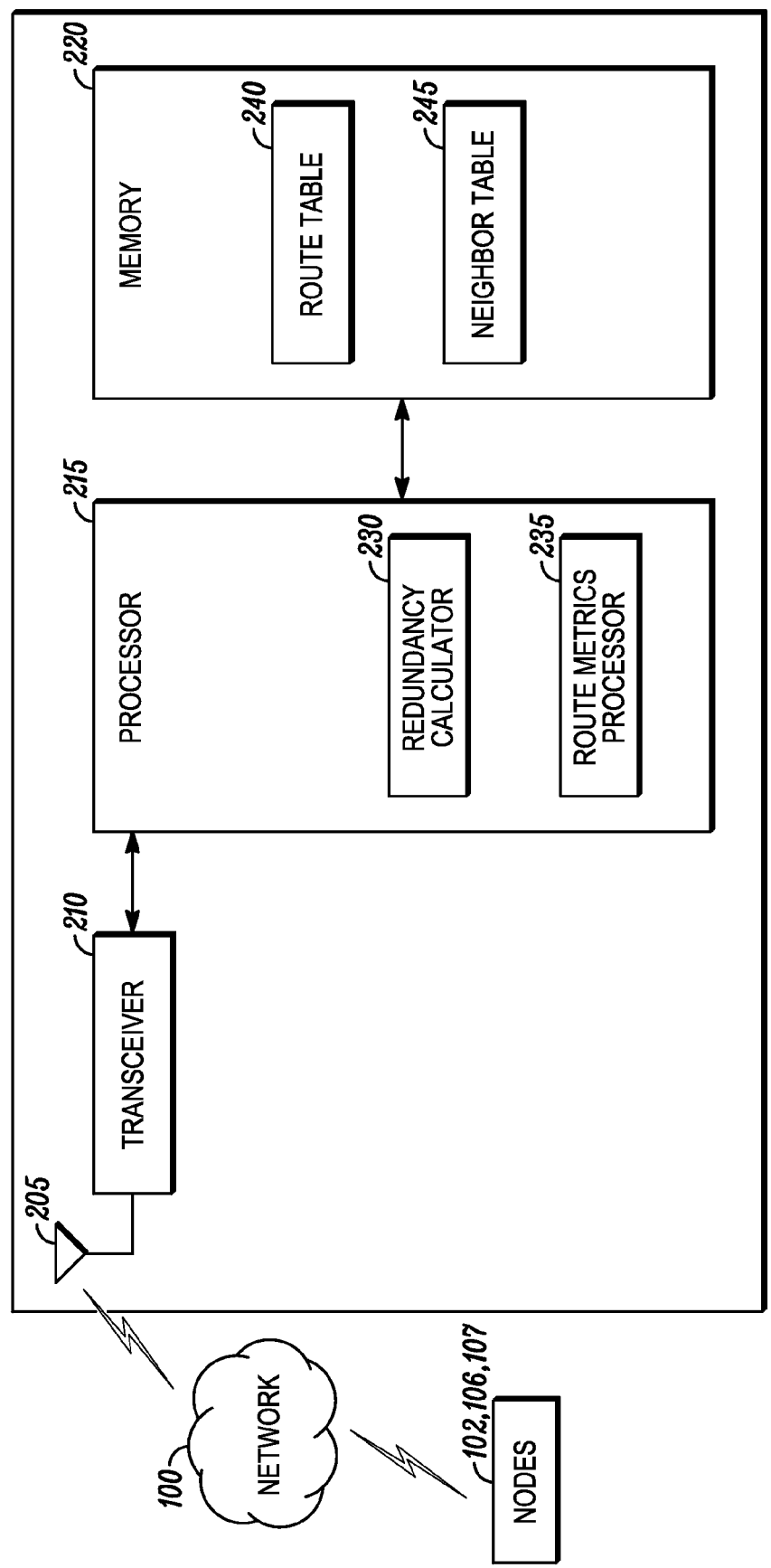
FIG. 2 is a block diagram illustrating an example of a node employed in the wireless network shown in FIG. 1.

As shown in FIG. 2, each node 102, 106 and 107 includes a node transceiver or a node modem 210, which is coupled to a node antenna 205 and for receiving and transmitting communication signals, such as packetized signals, to and from the node 102, 106 or 107, under the control of a node processor 215. The packetized data signals can include, for example, voice, data or multimedia information, and packetized control signals, including node update information. The node processor 215 includes a redundancy calculator 230 and a route metrics processor 235.

Each node 102, 106 and 107 further includes a node memory 220, such as a random access memory (RAM) for storing, among other things, routing information pertaining to itself and other nodes in the network 100. Routing information includes a route table 240, and a neighbor table 245. The route table 240 stores an active route list and proxy list. Each route to particular network destination is associated with a routing metric. The route table 240 lists the address of the next device (node) along the route to that particular destination. Examples of some of the attributes stored in the neighbor table 245 include a neighbor node list and one or more parameters such as Link Quality Measurements (LQMs) (which account for the quality of a wireless link with a particular neighbor node).

The route metrics processor 235 of the node processor 215 is used for determining one or more of a plurality of routes through which a client node (102, 106, or 107) can reach a destination node (102, 106, or 107). Each route may be formed of one or more intermediary nodes (102, 106, or 107). The path between two intermediary nodes is referred to as a link. In an example, the destination node is outside the network 100. In another example, the destination node is a gateway. The route metrics processor 235 then calculates an end-to-end metric for each route. Here end-to-end metrics can be defined the metrics along a route (i.e., the cumulative metric of each link that forms the route). The end-to-end metric for each route is referred to as a routing metric. The route metrics processor 235 calculates the routing metric for a route based on a route capacity of each link of the route. The calculated routing metrics are then stored in the route table 240 of the node memory 220.

The redundancy calculator 230 in the node processor 215 is used for calculating service redundancy of the wireless network 100 based on the calculated routing metrics. In an embodiment, service redundancy is defined as the measure of additional capacity offered by alternate routes to a destination.

Further, certain nodes, especially mobile nodes 102, can include a host (not shown) which may consist of any number of devices, such as a notebook computer terminal, a mobile telephone unit, a mobile data unit, or any other suitable device. Each node 102, 106 and 107 also includes the appropriate hardware and software to perform Internet Protocol (IP) and Address Resolution Protocol (ARP), the purposes of which can be readily appreciated by one skilled in the art. The appropriate hardware and software to perform transmission control protocol (TCP) and user datagram protocol (UDP) may also be included.

Figure 3:
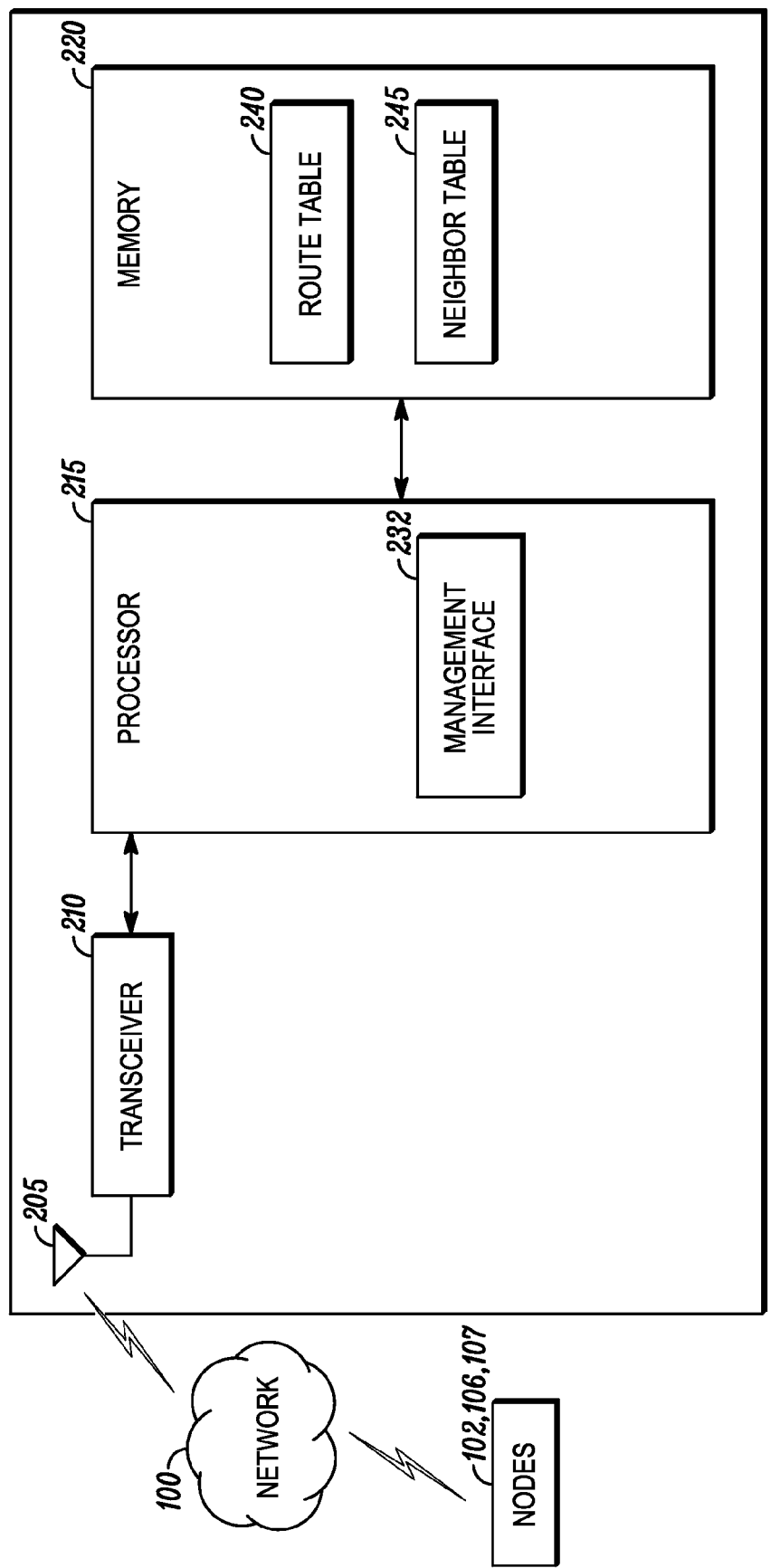
FIG. 3 is a block diagram illustrating another example of a node employed in the wireless network shown in FIG. 1.

In an embodiment, as shown in FIG. 3, the node processor 215 of nodes 102, 106, or 107 includes a management interface 232 for sending the routing information (route table 240 and neighbor table 245) stored in the node memory 220 to the central administrator 105. The central administrator 105 calculates service redundancy associated with nodes 102, 106, or 107. In this embodiment, service redundancy is calculated centrally at the central administrator 105. In another embodiment, a node 102, 106, or 107 receives the routing information pertaining to other nodes in the network from the central administrator 105 or directly from other nodes and locally calculates service redundancy associated with the node 102, 106, or 107. In an example embodiment, a decision as to whether the service redundancy calculation is to be performed centrally by the central administrator 105 or locally by a node 102, 106, or 107 is made based on a parameter. Examples of parameter include a circumstance, a need, and a location.

Figure 4:
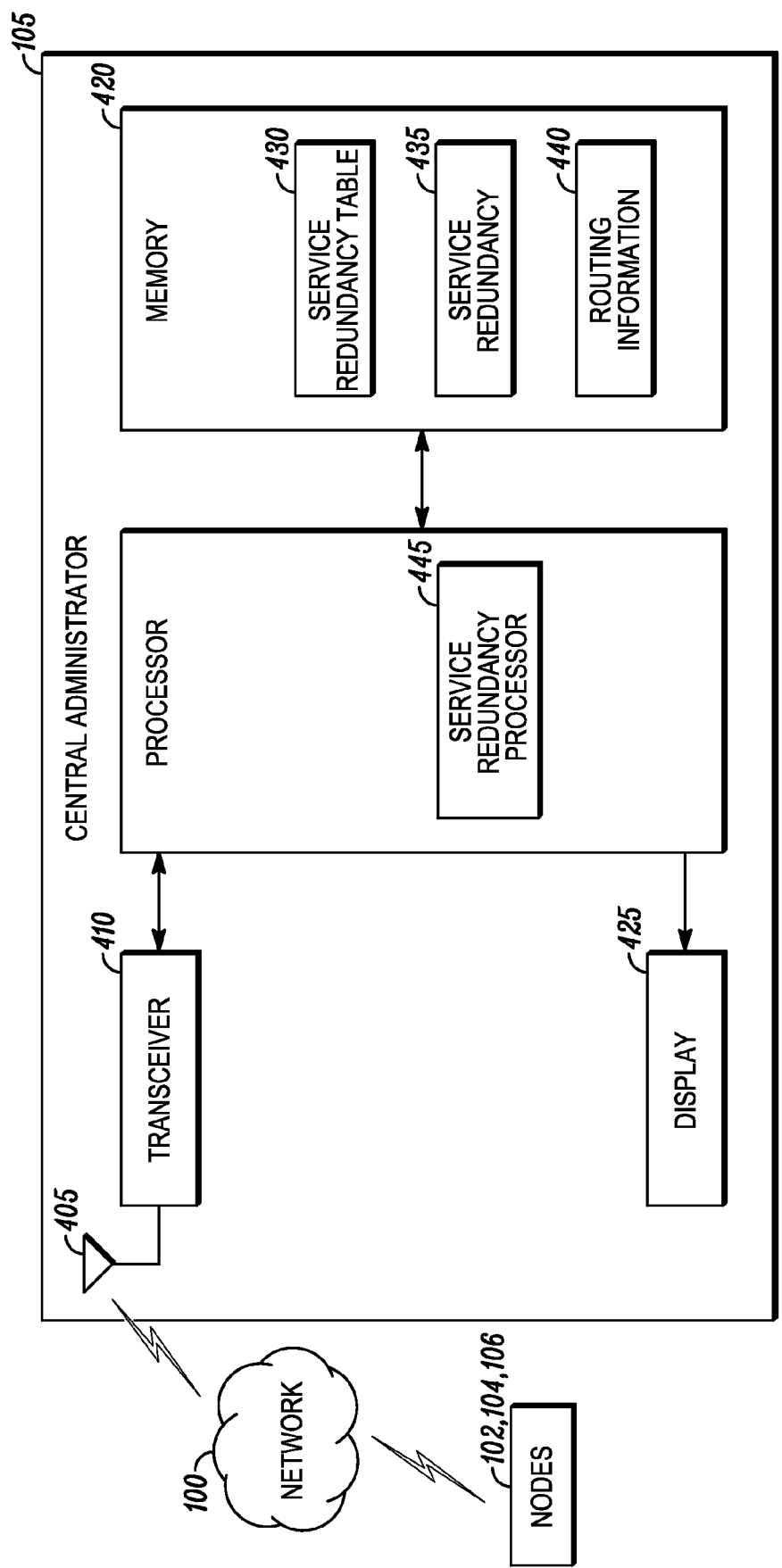
FIG. 4 is a block diagram illustrating an example of a central administrator employed in the wireless network shown in FIG. 1.

As shown in FIG. 4, the central administrator 105 includes a central administrator transceiver or central administrator modem 410, which is coupled to a central administrator antenna 405 for receiving and transmitting communication signals, such as packetized signals, to and from one or more nodes 102, 106 or 107, under the control of a central administrator processor 415. The packetized data signals can include, for example, data or multimedia information, and packetized control signals, including node update information. The central administrator 105 receives routing information (240 and 245) from each the nodes 102, 106, and 107. The central administrator processor 415 includes a service redundancy processor 445 for calculating a level of service redundancy at each node 102, 106, and 107 within the network 100.

The central administrator 105 further includes a central administrator memory 420, such as a random access memory (RAM) for storing, among other things, service redundancy information pertaining to other nodes in the network 100. Such service redundancy information includes a service redundancy table 430, service redundancy 435, and routing information 440 (route table 240 and neighbor table 245). Based on the routing metrics of each route, the central administrator 105 calculates the service redundancy for each node 102, 106, and 107. The central administrator 105 then generates the service redundancy table 430 indicating the service redundancy of the network 100.

The central administrator also includes hardware and software to perform Internet Protocol (IP) and Address Resolution Protocol (ARP), the purposes of which can be readily appreciated by one skilled in the art. The appropriate hardware and software to perform transmission control protocol (TCP) and user datagram protocol (UDP) may also be included.

Figure 5:
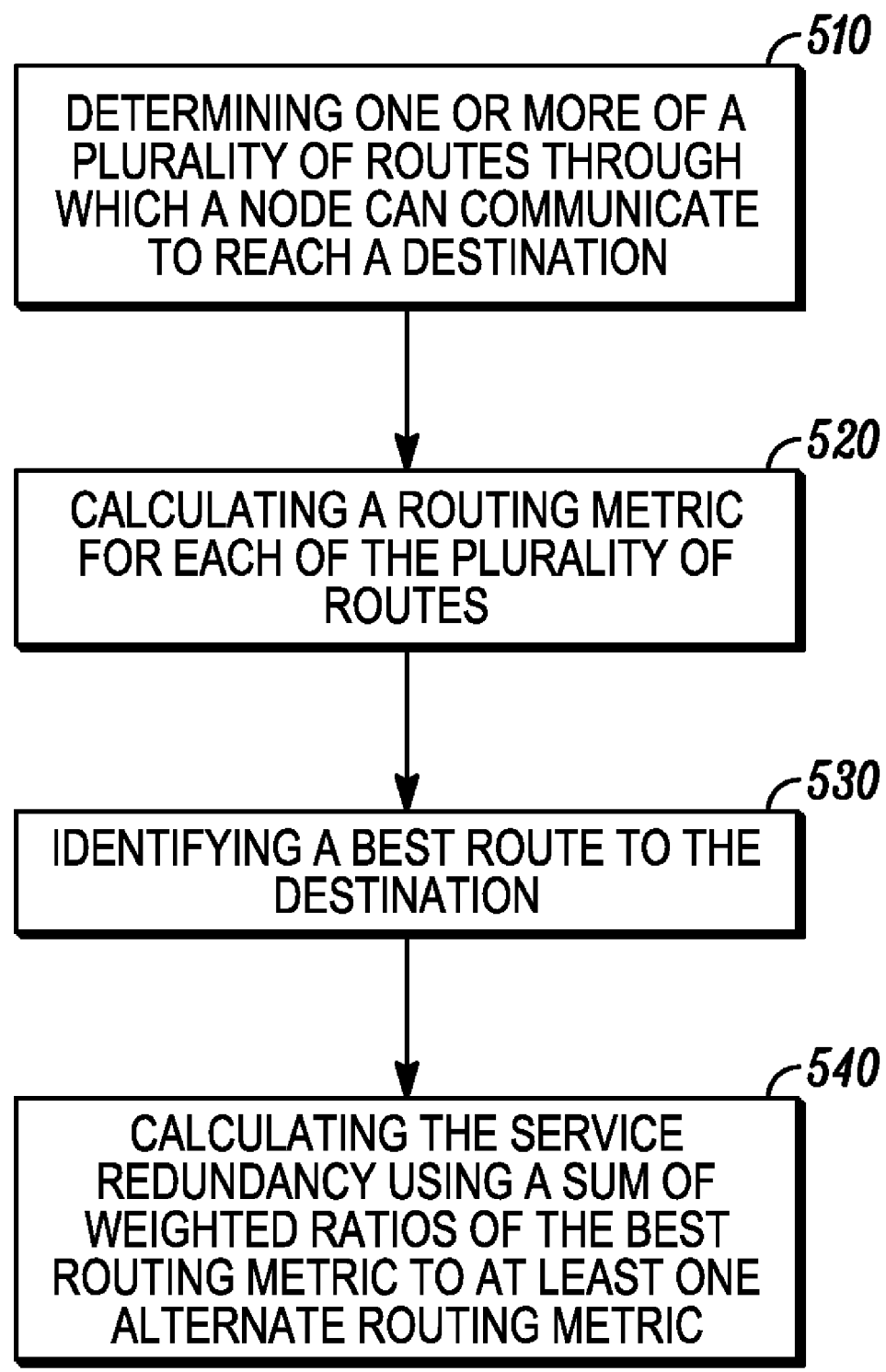
FIG. 5 is a flowchart illustrating a method of calculating service redundancy in accordance with an embodiment of the present invention.

FIG. 5 is a flowchart illustrating a method of calculating service redundancy at a node within the network. At step 510, one or more of a plurality of routes through which a node can communicate to reach a destination node is determined. It will be appreciated by those of ordinary skill in the art that each route may be formed of one or more of a plurality of intermediary nodes. Examples of intermediary nodes are a mobile node, a fixed router, a wireless router, a gateway router, a server, a network card, and an access point, and the like. At step 520, a routing metric for each of the plurality of routes is determined. As mentioned previously herein, the routing metric for each route is calculated using a route capacity of each route. The routing metric is measured as "the amount of time required to send a unit of information" i.e., the routing metric is inversely proportional to the measure of route capacity. Route capacity is expressed in terms of quantity of information per unit of time. At step 530, a best route to the destination node is identified among the plurality of routes. The best route is the route having the best routing metric. According to the requirement that a route provides the highest capacity, the lowest routing metric is the best routing metric. As an example, a unit of time is in seconds and a reference unit of information is a Gigabit. It will be appreciated that other units of time and other reference units of information can be utilized in accordance with the present invention. If a first alternate route to a destination node has a throughput of ten (10) mega bits per second (Mbps), then a Gigabit of information takes one hundred (100) seconds to be sent. One hundred (100) is therefore the routing metric for that particular route. Similarly, at six (6) Mbps, a second alternate route takes one hundred and sixty six (166) seconds to send a Gigabit of information. From this example, the first route which takes a shorter amount of time to send a unit of information is identified as the best route with a best routing metric of 100.

At step 540, service redundancy is calculated using a sum of the weighted ratios of at least one alternate route capacity to the best route capacity. Alternate route capacities are the route capacity for each of the plurality of routes which are not identified as the best route. In an embodiment, service redundancy is calculated by calculating a weighted sum of the alternate route capacities and then normalizing the calculated weighted sum with respect to the best route capacity. Since the routing metric and route capacity are inversely proportional to one another, in an embodiment, service redundancy is calculated by calculating a weighted sum of the ratio of the best routing metric to each of the alternate routing metrics.

Service redundancy, in one embodiment, is calculated in terms of a redundancy ratio metric as below, $$R = \sum_{i=2}^{N} \left(\frac{M_1}{M_i}\right)^W$$

Where,
R represents the redundancy ratio metric,
$M_1$ represents a routing metric of a best route to a destination,
$M_i$ (i=2 to N) represents a routing metric of each of one or more alternate routes to the destination, and
W represents a weight of the routing metric of the best route to the routing metrics of the alternate routes.

The redundancy ratio metric calculated as above provides an estimate of redundancy in the network. In this case, lower the routing metric, better the route. The existence of an alternate route with the same routing metric would mean that there is one hundred percent (100%) redundancy. Since routes having increasing routing metrics provide increasingly unsuitable routes, the ratio of the best route to alternate routes is raised to a certain power to give more weight to suitable metrics than unsuitable metrics.

Figure 6:
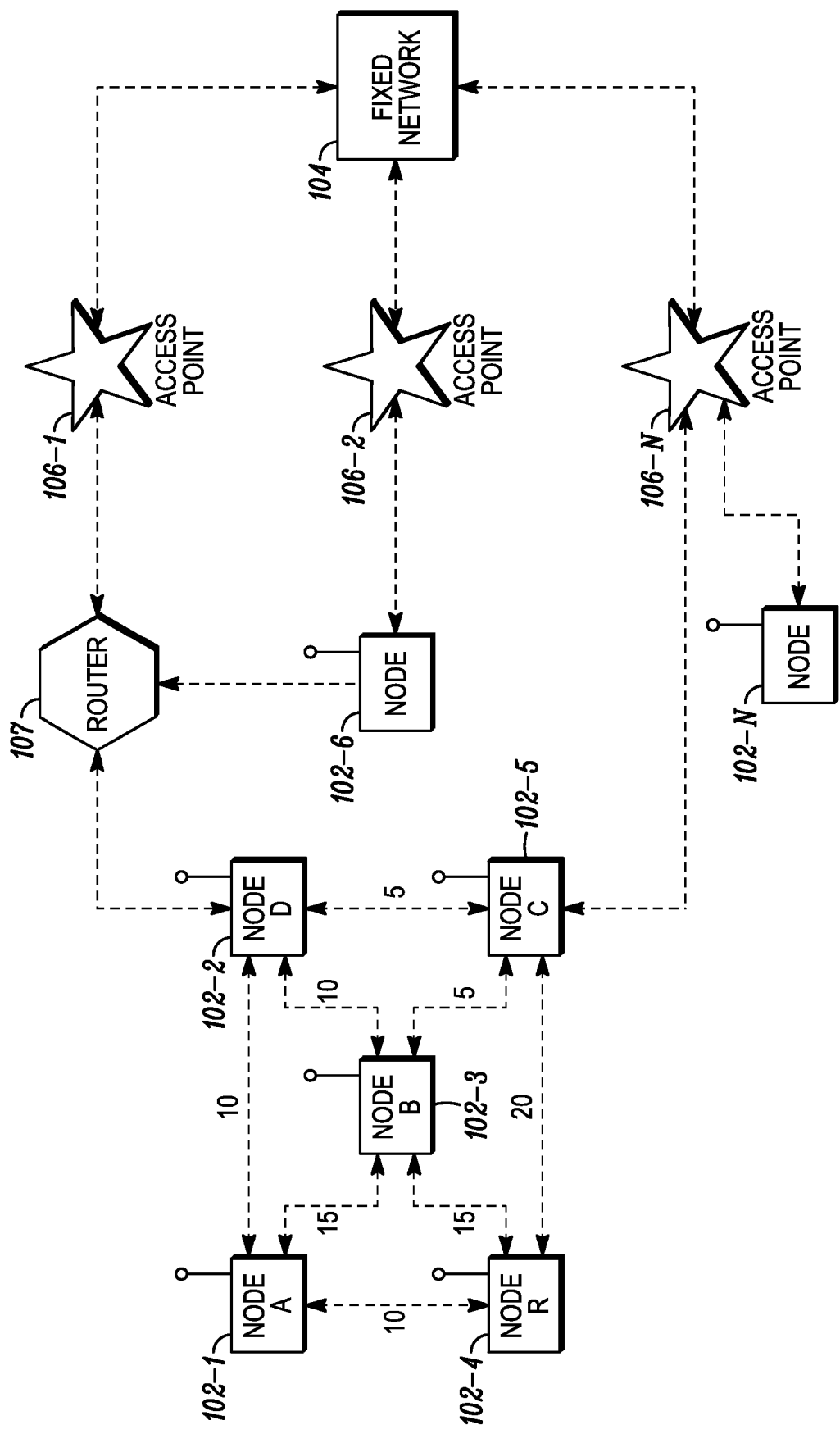
FIG. 6 is a block diagram of an example wireless network showing a plurality of interconnected nodes.

In an example embodiment, as shown in FIG. 6, the wireless network includes a plurality of intermediary nodes (A, B, C) that define a route from a client node (R) 102-4 to a destination node (D) 102-2. A service redundancy table (as shown in Table 1 below) can be generated for the network 100 as shown in FIG. 5. Table 1 shows several routes through which the client node (R) can reach the destination node (D), routing metric for each route, and the hops through intermediary nodes (A, B, C).

TABLE 1

| Service redundancy table | | | | | |
| --- | --- | --- | --- | --- | --- |
| Route number | Route metric | Hop 1 | Hop 2 | Hop 3 | Hop 4 |
| 1 | 20 | R → A | A → D | | |
| 2 | 35 | R → A | A → B | B → D | |
| 3 | 35 | R → A | A → B | B → C | C → D |
| 4 | 25 | R → B | B → D | | |
| 5 | 40 | R → B | B → A | A → D | |
| 6 | 25 | R → B | B → C | C → D | |
| 7 | 25 | R → C | C → D | | |
| 8 | 35 | R → C | C → B | B → D | |
| 9 | 50 | R → C | C → B | B → A | A → D |

From the definition of routing metric, the lower the routing metric, the better the route. Accordingly, Route 1 which has the lowest routing metric (the least amount of time required to send a unit of information) of twenty (20) is identified as the best route. Route 1, is defined by the intermediary node A, having a first hop from R to A and a second hop from A to D. Also, from Table 1, routes 4, 6, and 7 have the second best routing metric of twenty five (25). Routes 4, 6, and 7 are identified as good alternate routes from R to D. If routing metrics of good alternate routes become better, i.e. if the routing metrics of routes 4, 6, and 7 become lower than 25 or remains at 25, then redundancy of the network is considered to be high. If the routing metrics of good alternate routes become worse i.e. if the routing metrics of routes 4, 6, and 7 become higher than 25, then redundancy of the network is considered to be low.

Using the example in Table 1, the redundancy ratio metric can be calculated as below, $$R = \sum_{i=2}^{9} \left(\frac{M_1}{M_i}\right)^W$$

$R = (20/35)\wedge 2 + (20/35)\wedge 2 + (20/25)\wedge 2 + (20/40)\wedge 2 +$
$(20/25)\wedge 2 + (20/25)\wedge 2 + (20/35)\wedge 2 + (20/50)\wedge 2$ $R = 3.310$ or $331\%$ Where,
R represents the redundancy ratio metric,
$M_1$ represents a routing metric of a best route which in this example is identified as route 1, $M_i$ (i=2 to 9) represents a routing metric of each of one or more alternate routes to the destination which in this example are routes 2 through 9, and W represents a weight of the routing metric of the best route to the routing metrics of the alternate routes, which is taken as 2 as an example.

Figure 7:
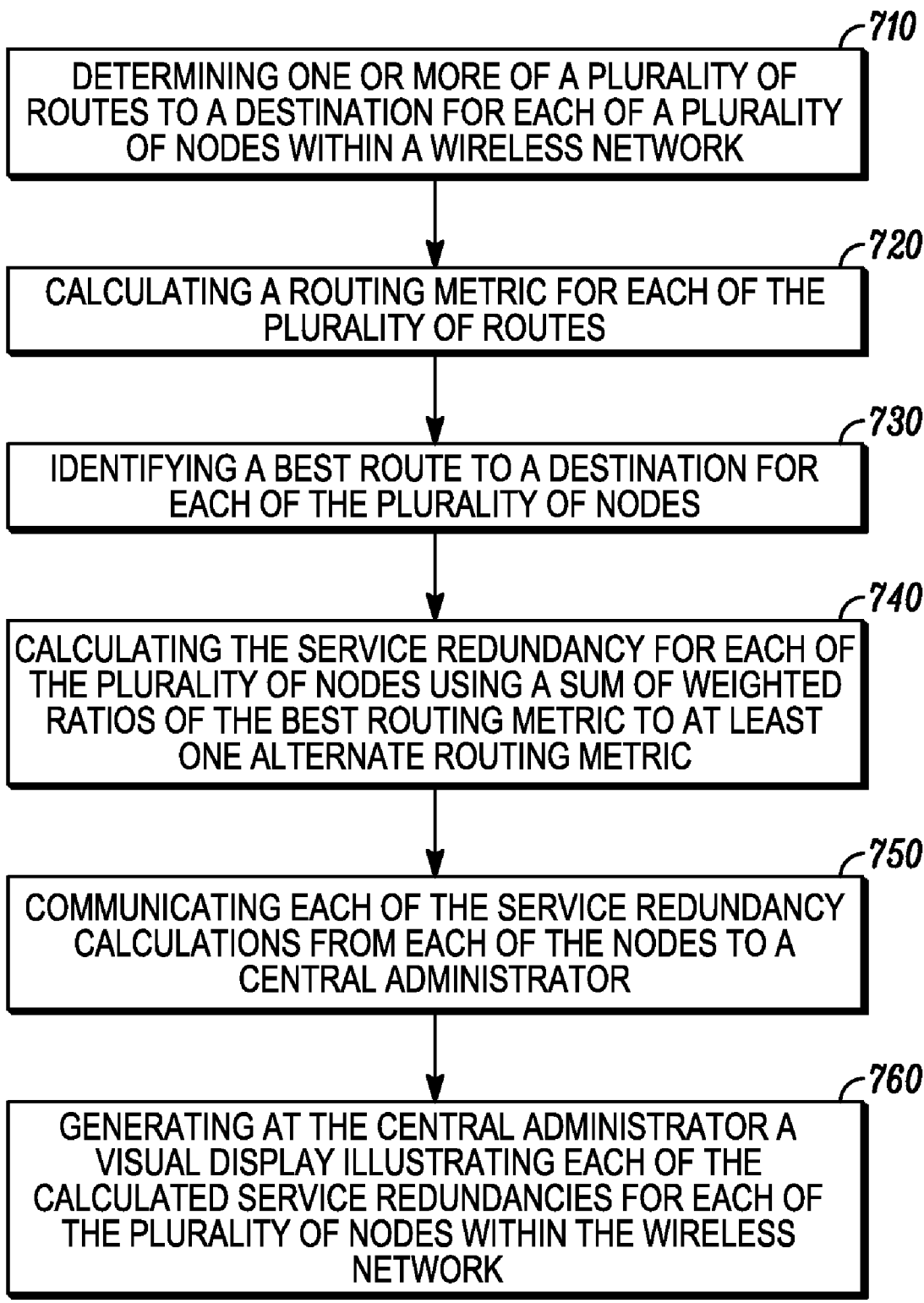
FIG. 7 is a flowchart illustrating a method of calculating service redundancy in accordance with another embodiment of the present invention.

FIG. 7 is a flowchart illustrating a method of calculating service redundancy at a central administrator of the network. The network includes a plurality of nodes. At step 710, one or more of a plurality of routes to a destination node for each of the plurality of nodes is determined at each respective node. At step 720, a routing metric for each of the plurality of routes is calculated by each respective node. At step 730, a best route to a destination is identified for each of the plurality of nodes by each respective node. At step 740, the service redundancy for each of the plurality of nodes is calculated. Service redundancy is calculated using the sum of the weighted ratios of the best routing metric to at least one alternate routing metric.

At step 750, the service redundancy calculation for each of the nodes is communicated to the central administrator 105. At step 760, the central administrator 105 generates a visual display illustrating each of the calculated service redundancies for each node within the wireless network. In an embodiment, the visual display is in the form of a redundancy indicator which includes a map of a geographic region. The visual display may then be displayed on a display 425 at the central administrator 105 or at each node.

Figure 8:
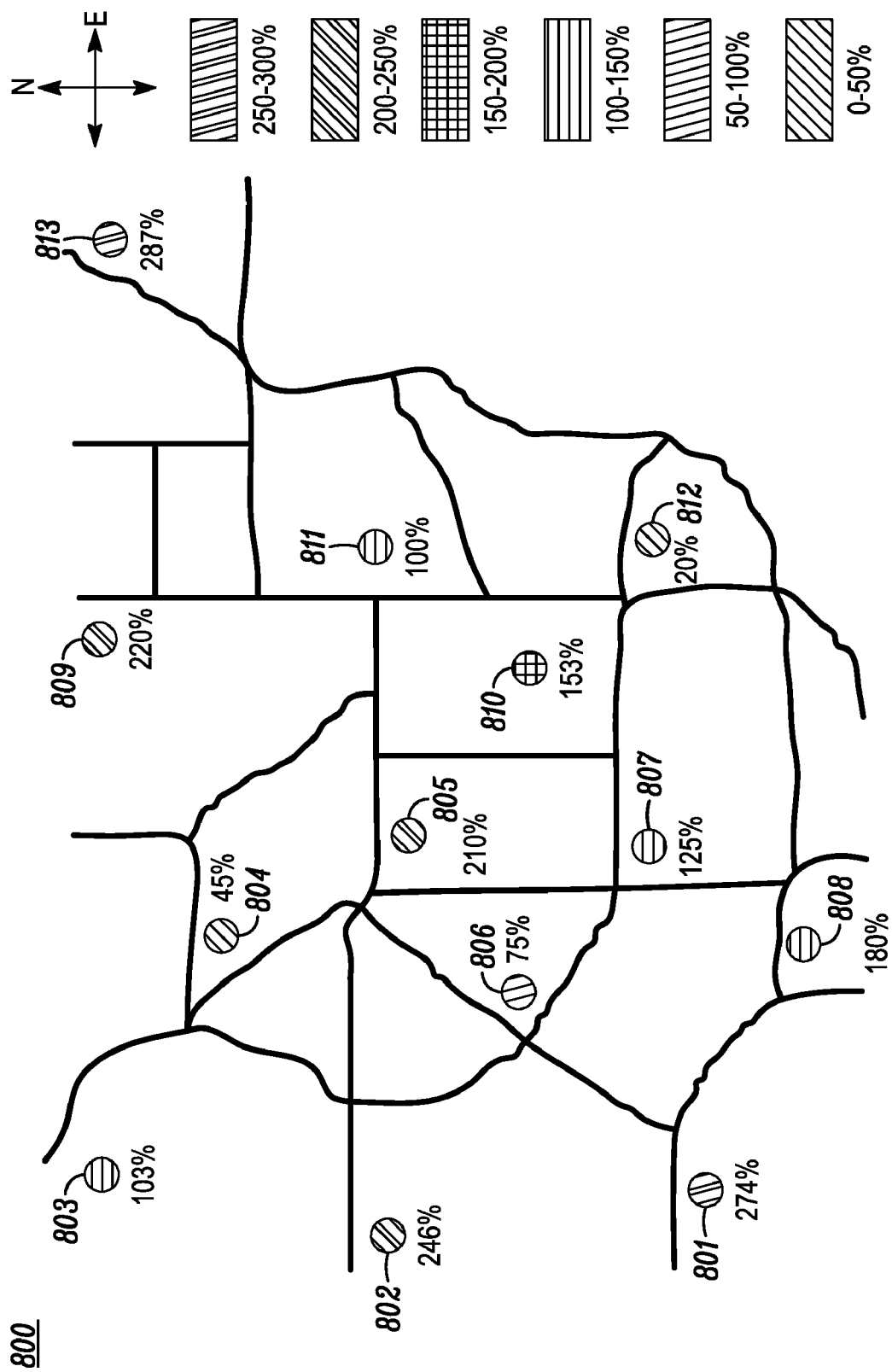
FIG. 8 is a visual display illustrating the calculated service redundancies of each node in a network.

As shown in FIG. 8, the redundancy indicator 800 shows nodes (804, 812) with few good links to neighbor nodes as having a low level of redundancy (45% and 20%), while nodes (801, 805, 813) with many good links to neighbor nodes as having a high level of redundancy (274%, 210%, and 287%). A link is considered to be good if it has a good routing metric. The redundancy indicator 800 takes into account the best routing metric and provides a relative view. The visual display may also provide an end-to-end view of redundancy (not shown) i.e., redundancy of the route from a client node to a destination node (e.g. a gateway). The redundancy indicator may provide special effects to distinguish between routes having good routing metrics and routes having bad routing metrics. As an example, the level of redundancy may be represented by a color from a color scale or as a pattern from a pattern scale as shown in Figure.

In another embodiment, the central administrator generates a table having the calculated service redundancies for each node within the network. The generated table may then be displayed at the central administrator or at each node. The table may have special effects to differentiate between different levels of service redundancies. As an example, the table may have different patterns for different levels of redundancy.

In an embodiment, the service redundancies of the nodes are monitored by each node to determine if the service redundancy goes beyond or below a desired level. The desired level of redundancy may be determined based on network needs. When it is detected that the service redundancy has gone beyond or below the desired level, the node sends a message to the central administrator calling for attention.

Applications

Some of the Applications of the present invention are described below.

The present invention provides for quantizing, monitoring, and controlling service redundancy in a network from a customer perspective. In an example, the customer is a network administrator, site surveyor, or a service provider. Some of the needs that can be fulfilled by the teachings of the present invention are a) reducing repair and intervention costs. For example, if a node which has the worst routing metric fails, there is no need for immediate action. The network still has good redundancy offered by good alternate routes; b) improved failure analysis. Since the redundancy indicator is linked to additional capacity available at a particular node at a particular time, the failure of some nodes may be such that available capacity is below an unacceptable level; c) aid communication gateway selection. In hierarchical networks where mobile devices select their own communication gateway, it may be necessary to disable an access point or limit connectivity to the access point. This is possible if it is known that the access point does not provide good capacity assistance. The access point's redundancy indicator is useful to determine whether it is useful or not. Thus, the present invention helps in visualizing network capacity in a manner that enables the customer to identify vulnerable areas and to take quick corrective action.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

The invention claimed is:

1. A method for calculating service redundancy of a wireless network, the method comprising:
    operating a node within the wireless network to:
        determine one or more of a plurality of routes through which the node can communicate to reach a destination;
        calculate a routing metric for each of the plurality of routes;
        identify a best route to the destination, wherein the best route has a best routing metric; and
        calculate a redundancy ratio metric using a sum of ratios of the best routing metric to a plurality of alternate routing metrics, wherein the alternate routing metrics comprise a routing metric for each of the plurality of routes not identified as the best route, wherein each of the ratios is given a proportional weight relative to a suitability of its alternate routing metric.

2. A method as claimed in claim 1, wherein the routing metric for each of the plurality of routes is calculated using a route capacity of each of the plurality of routes.

3. A method as claimed in claim 2, further comprising:
    operating the node to:
        measure the route capacity of each of the plurality of routes as an amount of information that can be sent in a unit of time.

4. A method as claimed in claim 1, wherein each of the plurality of routes comprises a plurality of intermediary nodes.

5. A method as claimed in claim 4, wherein the intermediary nodes comprise one or more of a mobile node, a fixed router, a wireless router, a gateway router, a server, a network card and an access point.

6. A method as claimed in claim 1, wherein operating the node to calculate the service redundancy further comprises:
    operating the node to:
        calculate a weighted sum of alternate route capacities; and
        normalize the calculated weighted sum with respect to a best route capacity.

7. A method as claimed in claim 1, further comprising:
    operating the node to:
        repeat the route determining, routing metric calculating, best route identifying, and service redundancy calculating steps for each of a plurality of nodes within the wireless network.

8. A method as claimed in claim 7, further comprising:
    operating the node to:
        communicate each of the service redundancy calculations from each of the nodes to a central administrator; and
    operating the central administrator to:
        generate a visual display illustrating the calculated service redundancies for each of the plurality of nodes within the wireless network.

9. A method as claimed in claim 8, wherein the visual display is a map illustrating the service redundancy.

10. A method as claimed in claim 7, further comprising:
    operating the node to:
        communicate each of the service redundancy calculations from each of the nodes to a central administrator; and
    operating the central administrator to:
        generate a table comprising the calculated service redundancies for each of the plurality of nodes within the wireless network.

11. A method as claimed in claim 1, further comprising:
    operating the node to:
        send a message to a central administrator when a service redundancy goes below or beyond a certain level.

12. A method as claimed in claim 1, wherein the destination is outside the wireless network.

13. A method as claimed in claim 1, wherein the destination is a gateway.

* * * * *